United States Patent
Lord et al.

(10) Patent No.: US 7,037,112 B2
(45) Date of Patent: May 2, 2006

(54) VIRTUAL ARM FOR MEASUREMENT OF HUMIDITY, TEMPERATURE, AND WATER VAPOR TRANSMISSION RATE IN MATERIALS

(75) Inventors: Patrick R. Lord, Appleton, WI (US); Timothy Schmitz, Menasha, WI (US); Arvinder Singh, Neenah, WI (US); Frank F. Kromenaker, Appleton, WI (US); Rick Beal, Oshkosh, WI (US); Jason Cohen, Appleton, WI (US); Martha L. Tate, Atlanta, GA (US); Audra S. Wright, Woodstock, GA (US); Nancy Puckett, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 193 days.

(21) Appl. No.: 10/324,365

(22) Filed: Dec. 20, 2002

(65) Prior Publication Data

US 2004/0121294 A1 Jun. 24, 2004

(51) Int. Cl.
*G09B 23/28* (2006.01)

(52) U.S. Cl. .................. 434/262; 434/268; 434/272
(58) Field of Classification Search ............... 434/126, 434/262, 267, 268, 272, 295, 328, 329
See application file for complete search history.

(56) References Cited

U.S. PATENT DOCUMENTS

| | | | |
|---|---|---|---|
| 1,561,285 A | 11/1925 | Sesler | |
| 2,545,281 A | 3/1951 | Hunt | |
| 2,752,697 A * | 7/1956 | Lawall | 434/268 |
| 3,341,394 A | 9/1967 | Kinney | |
| 3,502,538 A | 3/1970 | Peterson | |
| 3,502,763 A | 3/1970 | Hartmann | |
| 3,542,615 A | 11/1970 | Dobo et al. | |
| 3,952,584 A | 4/1976 | Lichstein | |
| 4,041,203 A | 8/1977 | Brock et al. | |
| 4,209,939 A * | 7/1980 | Pittala | 446/267 |
| 4,257,188 A | 3/1981 | Barker | |
| 4,340,563 A | 7/1982 | Appel et al. | |
| 4,357,827 A | 11/1982 | McConnell | |
| 4,360,345 A * | 11/1982 | Hon | 434/262 |
| 4,720,415 A | 1/1988 | Vander Wielen et al. | |
| 4,773,865 A * | 9/1988 | Baldwin | 434/268 |
| 4,932,919 A | 6/1990 | Shapero | |
| 5,066,259 A | 11/1991 | Acker | |
| 5,067,924 A | 11/1991 | Munter | |
| 5,320,733 A * | 6/1994 | Bohm | 204/408 |
| 5,361,627 A | 11/1994 | Levesque | |
| 5,409,382 A * | 4/1995 | Donnelly et al. | 434/267 |
| 5,419,729 A | 5/1995 | Gross | |
| 5,425,265 A | 6/1995 | Jaisinghani | |
| 5,518,436 A | 5/1996 | Lund et al. | |
| 5,913,708 A | 6/1999 | Gross | |
| 5,941,710 A * | 8/1999 | Lampotang et al. | 434/272 |
| 6,015,935 A | 1/2000 | LaVon et al. | |
| 6,107,537 A | 8/2000 | Elder et al. | |

(Continued)

FOREIGN PATENT DOCUMENTS

| | | |
|---|---|---|
| CA | 803714 | 1/1969 |
| GB | 2272182 A | 5/1994 |

*Primary Examiner*—Kurt Fernstrom
(74) *Attorney, Agent, or Firm*—Dority & Manning, P.A.

(57) ABSTRACT

A device is provided for simulating a human skin microclimate and for measuring conditions such as temperature and humidity in the simulated microclimate. The microclimate is formed, for example, with fluids, gases and/or heat in a chamber of the device or between a surface of the device and a material disposed about the surface. In one aspect, a sensor is placed in the chamber to sense the microclimate. Methods of using the device and measuring microclimate conditions are also provided.

81 Claims, 9 Drawing Sheets

U.S. PATENT DOCUMENTS

| | | |
|---|---|---|
| 6,152,906 A | 11/2000 | Faulks et al. |
| 6,298,714 B1 | 10/2001 | Courtray |
| 6,413,142 B1 | 7/2002 | Weastler |
| 6,446,495 B1 | 9/2002 | Herrlein et al. |
| 6,464,557 B1 | 10/2002 | Ohba et al. |
| 6,483,324 B1 * | 11/2002 | Mitter et al. ................. 324/689 |
| 6,534,074 B1 | 3/2003 | Krzysik et al. |
| 6,543,657 B1 * | 4/2003 | Fan et al. ..................... 223/66 |
| 6,557,398 B1 | 5/2003 | Lindmark et al. |
| 2002/0191669 A1 | 12/2002 | Fan et al. |

* cited by examiner

| WVTR readings at different conditions |||||||
|---|---|---|---|---|---|---|
| Trial | Virtual Arm ||| Clinical Arm |||
| | RH | TEMP | WVTR | RH | TEMP | WVTR |
| BSLN | 42.7 | 73.4 | | 40.4 | 72.3 | |
| BSL1 | 30.7 | 92.2 | | 39.4 | 72.2 | |
| BSL2 | 36.5 | 90.8 | | 53.6 | 84.9 | |
| TST1 | 91.7 | 91.5 | 15.24 | 53.6 | 91.9 | 10.23 |
| TST2 | 89.8 | 92.1 | | 95.3 | 85.5 | |
| TST3 | 90.6 | 91.1 | 14.63 | 93.3 | 87.6 | 11.32 |
| TST4 | 91.4 | 91 | 15.31 | 87.7 | 89.5 | 11.87 |

FIG. 9

VIRTUAL ARM FOR MEASUREMENT OF HUMIDITY, TEMPERATURE, AND WATER VAPOR TRANSMISSION RATE IN MATERIALS

BACKGROUND OF THE INVENTION

Absorbent articles such as diapers, adult incontinence garments, feminine care products, child training pants, pull-ups, bandages, gloves and similar products that directly contact skin are well known. A disposable absorbent article is typically composed of a top layer that is adjacent to a user's body and a back layer that faces the clothing of the user. An absorbent material is located between the top layer and the bottom layer. The top layer permits a liquid from the user to move through the top layer toward the back layer. The back layer does not allow liquid to be transferred from the inside of the absorbent article onto the user's clothing. The absorbent material absorbs the liquid and keeps the skin dry.

During normal operation after a fluid is discharged from a user, the fluid will flow through the top layer and be absorbed by the absorbent material. The absorbent material is designed to absorb, redistribute, and store the fluid until the absorbent article is discarded. In some instances, however, fluid may return from the absorbent material to once again contact the user's skin. Fluid return can occur, for instance, if the absorbent material cannot sufficiently absorb the fluid due to the composition of the absorbent material. Unabsorbed liquid undesirably results in over-hydration of the contacted skin and in turn, increases a chance of skin irritation to the user. In addition to being an irritant, excessive moisture on the user's skin can cause, among other things, the growth of microorganisms that can lead to the onset of rashes or infection.

Various tests exist for measuring performance and suitability of absorbent materials to prevent the foregoing problems. Known tests include capacitance, capacitive reactance, conductance, electrical impedance, and/or evaporative or Trans-Epidermal Water Loss (TEWL) evaluations. Typically, these tests measure fluid absorbency, fluid leakage, and other criteria of the materials for use in absorbent articles.

By way of example, the Adult Forearm Test or "armband" test is conventionally used to evaluate the effectiveness of disposable diapers to keep the skin dry. In the armband test, changes in skin surface hydration are measured by evaporimetry or TEWL evaluation. To maintain a healthy and moisture-balanced skin, the TEWL readings between un-diapered and diapered skin should not differ significantly. One variation of the armband test uses pre-loaded patches from diapers placed on an adult volar forearm, and differences in skin surface hydration between cloth diapers and disposable paper diapers have been noted.

Another armband test uses an intact diaper wrapped around the forearm. Physiological saline is injected into the diaper at a rate and volume that represent normal urination by a child. Post-occlusion measurements are made after one hour, and measurements of skin hydration are made by computerized evaporimetry or by electrical conductance.

The above and other common tests have been used extensively for evaluating skin hydration of covered or diapered skin. It would be advantageous to have a bench top instrument that produces results similar to the TEWL test to reduce for instance high variability found in conventional tests.

BRIEF SUMMARY OF THE INVENTION

In general, the present invention is directed to a bench top instrument for evaluating materials quickly, efficiently, and cost effectively. In particular, a virtual arm is provided to evaluate the microclimate and hydration of the substrate covered by the test material. The virtual arm produces results similar to the TEWL test and is also used for determining microclimate conditions in the materials. The component parts of the invention are simple, reliable, and economical to manufacture and use.

In one aspect of the invention, a metallic cylinder is provided to simulate an adult forearm for rapidly evaluating a material for further evaluation, possibly on human subjects. The arm incorporates a fluid injection port to simulate a urethra, a sweat gland, a pore, and the like. A simulated skin substrate is placed on a portion of the arm proximate the fluid injection port. The prototype material is wrapped about the simulated skin substrate and the fluid injection port. Saline or other simulated physiological fluid is insulted into the prototype material. After a predetermined time, the prototype material is removed and the skin is evaluated for dryness.

In another aspect of the invention, a mechanical arm incorporates a fluid injection port to simulate a sweat gland, a pore, a urethra and the like. A material is wrapped about the arm and the fluid injection port. Saline or other simulated physiological fluid is insulted into the material. The material is held in place on the arm under a controlled temperature condition to allow determination of a microclimate in the material.

The foregoing aspects of the present invention enable rapid pre-screening of material at relatively low cost without many of the variables found in conventional screening devices and methods. Other aspects and advantages of the invention will be apparent from the following description and the attached drawings, or can be learned through practice of the invention.

BRIEF DESCRIPTION OF THE DRAWINGS

The above and other aspects and advantages of the present invention are apparent from the detailed description below and in combination with the drawings in which.

Repeat use of reference characters in the drawings and the detailed description is intended to represent same or analogous features or elements of the invention.

DETAILED DESCRIPTION OF THE DRAWINGS

Definitions

As used herein, the terms "simulated," "artificial," "synthetic" and like terms are used interchangeably to indicate manufactured materials or objects, and in the case of substrates, dissected or bio-engineered skin samples, unless otherwise indicated.

As used herein, the term "substrate" generally refers to a work-piece designed to simulate human skin. The substrate can be used directly as obtained from a living or dead source; from a bioengineered, cultured, or manufactured product; and/or following a pretreatment to modify a character of the substrate. For example, the substrate can be derived from any biological source such as a living/preserved skin sample from animal models including but not limited to a pig, a monkey, a rat, a human cadaver and similar sources. Examples of bioengineered or cultured sources include but are not limited to a VITRO-SKIN™ or VITRO-CORNEUM® product available from IMS Inc., Milford, Conn.; a TEST SKIN™ II product available from Organogenesis Inc., Canton, Mass.; a SKINETHIC® product available from Skinethic Tissue Culture Laboratories, Nice, France; EpiDerm™ simulated human skin from Matek Corporation, Ashland, Mass.; a medical grade collagen film; a collagen in a sausage casing; a cellulose film; a chamois; a cultured or bioengineered skin substrate; and similar materials.

By way of example, VITRO-SKIN™ contains protein and lipid components and is designed to have topography, pH, critical surface tension and ionic strength that mimic human skin. Its consistent "N-19" topography and wetting properties across each sheet are optimized to mimic relatively smooth skin found on the human back. Thus, testing done on VITRO-SKIN™ is generally more reproducible than that performed on human skin. In comparison, VITRO-CORNEUM® is a collagen-based substrate with properties similar to human stratum corneum i.e., the outer layer of epidermis of primarily dead skin cells. Specifically, VITRO-CORNEUM® is designed to simulate the thickness, viscoelasticity and surface properties of human stratum corneum. Another suitable simulated skin is collagen in a sausage casing. The collagen/casing arrangement is a cost-effective alternative for pre-screening materials and does not have to be handled and stored as a biological sample. An exemplary collagen film is available from NATURIN GmbH, Weinhein, Germany, under the designation of COFF12224 with a basis weight of about 28 $g/m^2$. Another exemplary collagen film is available from Devro, Inc, Geneva, Ill., under the designation of Cutisin™.

As used herein, the term "fluid" generally refers to a liquid, exudate or any substance having fluid-like properties suitable for simulating a physiological fluid. The fluid can be derived from any biological source, such as a physiological fluid, including blood, saliva, ocular lens fluid, cerebral spinal fluid, perspiration, urine, simulated urine, bowel movements (BM), milk, ascites fluid, synovial fluid, peritoneal fluid, amniotic fluid, menses fluid or the like. The fluid can be pretreated prior to use, such as preparing plasma from blood, diluting viscous fluid and the like. Methods of treatment can involve filtration, distillation, concentration, inactivation of interfering components, and the addition of reagents. Moreover, in addition to real or simulated physiological fluids, other liquid samples can be used, such as water, food products, saline, a solution of 0.9% sodium chloride, a colored solution, and the like to examine environmental or food absorption performance of a material.

As used herein, the term "material" generally refers to a natural or artificial product to be insulted with the fluid for evaluating skin hydration of a material-covered skin. The material can be a prototype material, a finished product, a competitor's product and the like. Examples of a material include but are not limited to an absorbent material, disposable or non-disposable diapers, diaper systems, adult incontinence products, feminine products, nursing healthcare products, child training products, bandages, gloves, face masks, disposable or non-disposable gloves, microporous film, stretchable film, latex rubber, cotton gauze, bandage materials, carded webs, vertical filament stretch-bonded laminates (VFL), spunbonded laminates (SBL), carriers with spunbond filaments or fibers (SMS), cellulose, absorbent composites, or any other material or garment used for contact with skin. Additionally, the material can be a nonwoven polymer material, an airlaid material, a wet material, a dry material, a treated material, and any disposable or non-disposable material.

As used herein, the term "microclimate" generally refers to an environment found in any area/volume between the material to be tested and the object upon which the material is attached. The area/volume includes but is not limited to any cavity, depression, void, chamber, or other area/volume between the material and the object that forms an internal climate or microclimate between the material and the object. For example, in one aspect herein, the microclimate is formed in a chamber defined within a cylinder. In another aspect, the microclimate is formed simply between a surface of the material and a surface of the object.

Detailed Description

Detailed reference will now be made to the drawings in which examples embodying the present invention are shown. The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended Claims and their equivalents.

In general, the present invention is directed to an evaluation apparatus for determining microclimate conditions in a material. The evaluation apparatus is also used for evaluating the substrate hydration covered by the test material. In particular, the present invention employs a virtual arm as a bench top instrument that produces results similar to the conventional TEWL test by simulating characteristics of a human arm. These characteristics include but are not limited to relative and absolute humidity, temperature, and physical dimensions. In addition to TEWL, humidity and temperature, the virtual arm allows determination of the microclimate conditions in the material based on spectroscopy, video, polymeric thin film sensors such as Electronic Nose, or other invasive or noninvasive monitoring.

Figure 1:
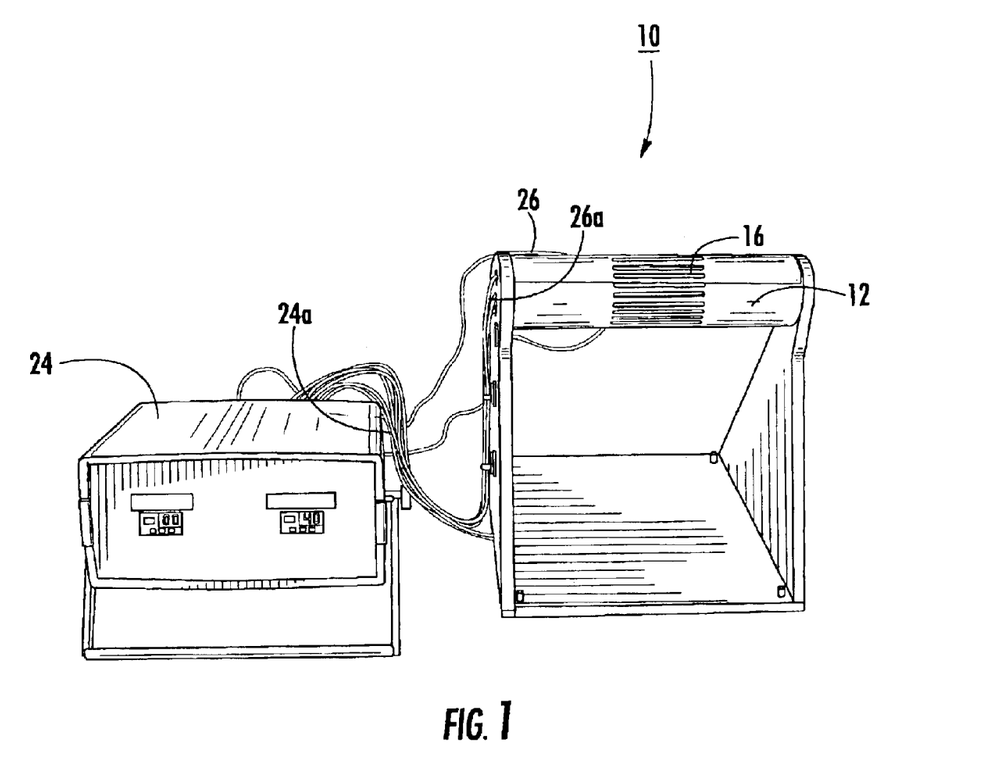
FIG. 1 is a front elevational view of an apparatus in accordance with an aspect of the invention.

Referring to FIG. 1, one embodiment of a bench test device 10 is shown having a virtual arm 12 mounted on a base or stand 14. The arm 12 defines a plurality of apertures or slots 16, which in this example cooperate to form an internal space or chamber 18 (see FIG. 4) in order to create a microclimate as will be described below. The arm 12 as shown can be adjustably attached to the stand 14 for ease of testing and is also connected to a controller 24, described below, via an electrical connection 24a.

In this example, the arm 12 is formed of a metal such as aluminum. Metal permits uniform heating of the arm 12 as described below. Although the exemplary arm 12 is made of aluminum, which can be anodized, other metals and materials such as steel, tin, brass, iron, glass, acetyl-plastic, acrylic-plastic, an elastomeric material, a high density polyethylene, or any other resin, epoxy or polymer, composite materials and similar moldable materials may be suitably used.

While the illustrated arm 12 is representative of a female forearm, it is not intended as a limitation of the invention. For example, the arm is about 2 inches to about 80 inches in circumference, often about 10 inches. The circumference of the arm 12 can be adjusted from about 2 inches to about 80 inches electronically, hydraulically, pneumatically, manually, or otherwise in proportion to the material M to be tested. For instance, the arm 12 may be adjusted to about 3 to about 5 inches in circumference to test a premature baby material M, or to about 80 inches in circumference to test a large size adult undergarment. Additionally, the exemplary arm 12 is about 10 inches to about 20 inches in length, more particularly about 12 inches, to accommodate a wide variety of materials M. It is contemplated that the arm 12 can be adjusted in length electronically, hydraulically, pneumatically, manually, or otherwise, for instance by telescoping, to accommodate the variety of materials M.

FIG. 1 further shows a thermosensor 26 attached to a surface 12c of the arm 12 and connected to the controller 24 via a thermosensor feedback 26a. The thermosensor 26 can be attached to the arm 12 by tape, snap-ons, hook and loop fastening systems, and the like in order to monitor a temperature of the arm 12 generated by a heater cartridge or heaters 22 (see FIG. 2). Specifically, the thermosensor 26, via the thermosensor feedback 26a, communicates the sensed temperature from the arm 12 to the controller 24 in order for the controller 24 to adjust or regulate the temperature within or about the arm 12 to maintain a constant, simulated, normal human body temperature or skin surface temperature.

Figure 2:
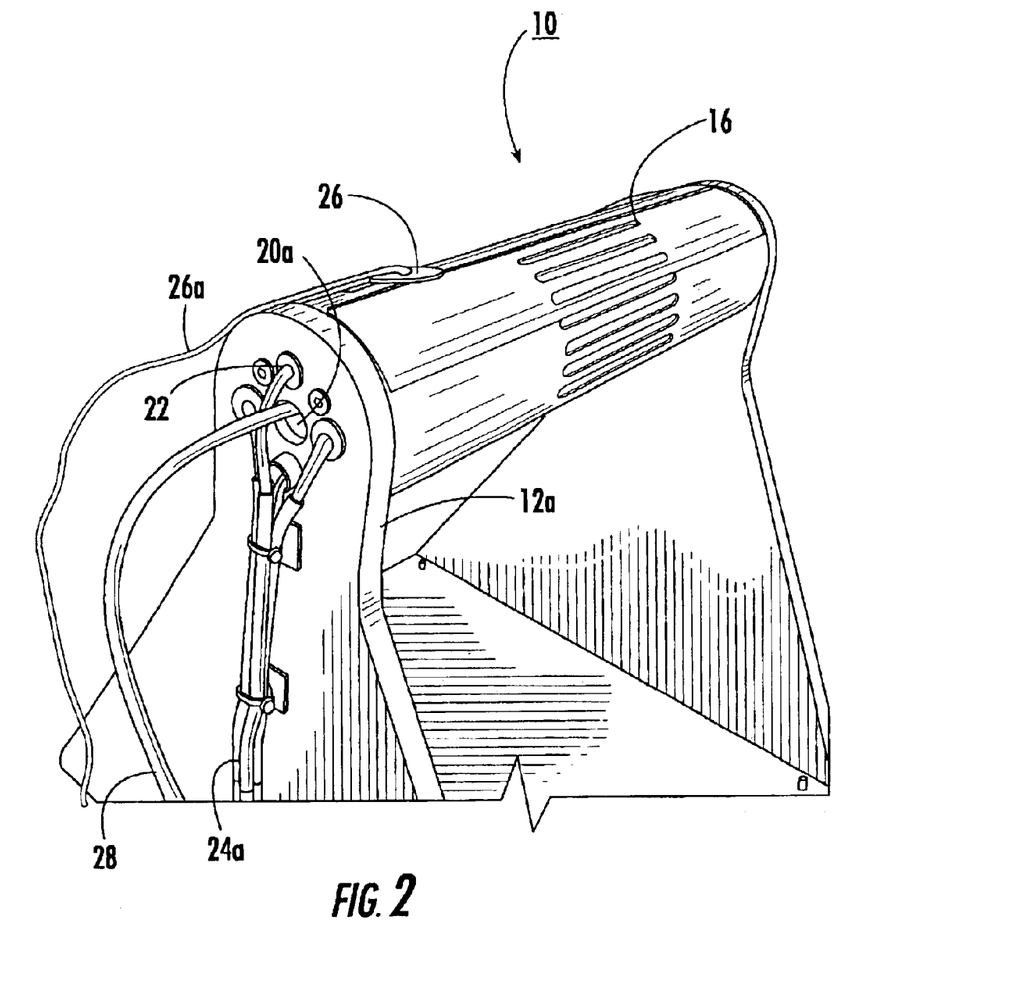
FIG. 2 is a perspective view of a portion of the apparatus as in FIG. 1, particularly showing an exemplary virtual arm.

More particularly, as shown in FIG. 2, a perspective view of the bench test device 10 clearly shows a plurality of heaters 22 inserted in an end 12a of the arm 12. The heaters 22 are connected to the temperature controller 24 via the electrical connection 24a. The controller 24 heats the heaters 22 from about 70° Fahrenheit (F.) to about 120° F. to heat the arm 12. In this example, the heaters 22 uniformly heat the aluminum surface 12c of the arm 12 as well as the chamber 18 to about 85° to 99° F., usually to about 90° F. A skin 38 is attached to the heated surface 12c and is thereby heated to emulate normal human skin. By heating the arm 12 and the skin 38 to normal human skin temperature, TEWL and other measurements more closely reflect measurements that derive from conventional tests. Further details and example operations of the heater 22 and resulting measurements are described in the exemplary procedures and exemplary results sections below.

Also shown in FIG. 2 is an access hole 20a through which a sensor 28 is inserted into the chamber 18 of the arm 12.

The sensor 28 is a probe that measures temperature, relative humidity (Rh), and/or absolute humidity. Furthermore, the sensor 28 may use a fiber optic waveguide to monitor and record spectroscopic and/or chromatographic data. The sensor 28 may further include closed-circuit TV (CCTV), infrared (IR) and/or video capabilities. An example operation of the sensor 28 is described in greater detail below. Also as further described herein, a water vapor transmission rate (WVTR) emanating from the material M can be taken from the exterior of the material M while the material M is wrapped about the surface 12c.

Figure 3:
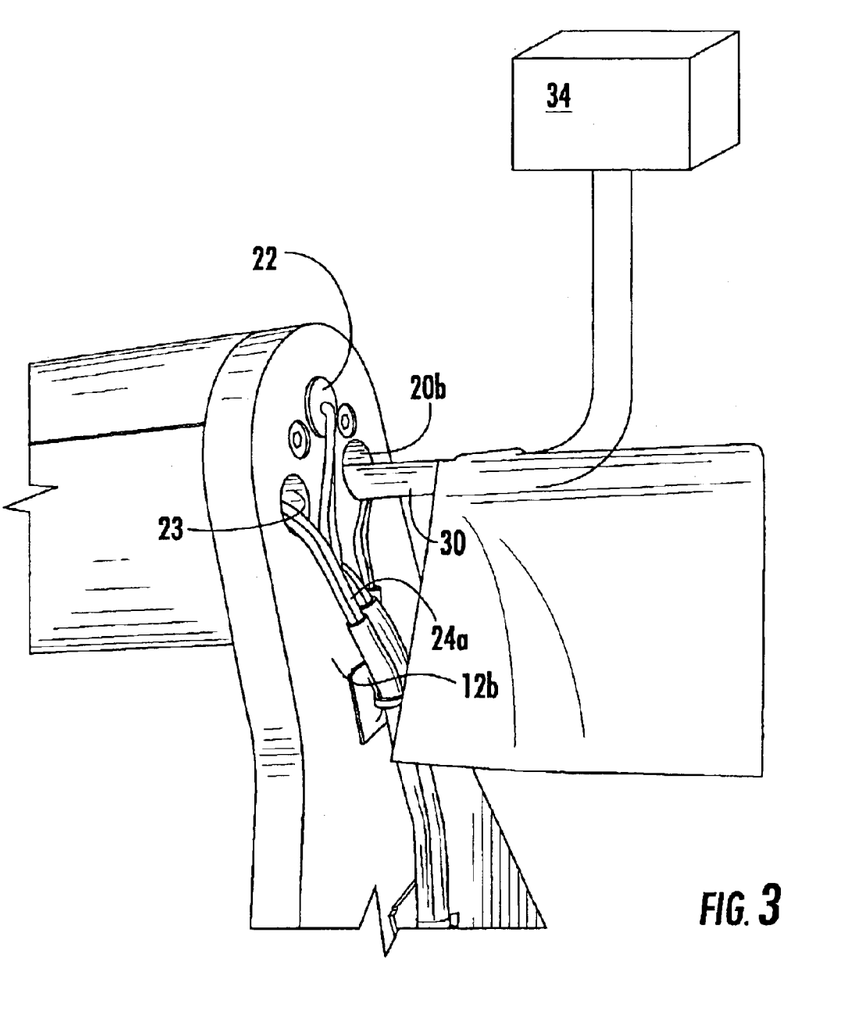
FIG. 3 is a partial end view of the virtual arm as in FIG. 2.

FIG. 3 shows a detailed perspective view of an end 12b of the arm 12. In this illustration, additional heaters 22 are shown inserted in a heater hole 23 similar to the arrangement at the end 12a shown in FIG. 2. Again, the heaters 22 at end 12b are connected to the controller 24 via the electrical connection 24a to heat the surface 12c of the arm 12 and the chamber 18.

FIG. 3 further illustrates a fluid insult tube 30 connected to a fluid delivery device 34. The fluid insult tube 30 is inserted into the arm 12 via an access hole 20b. In this aspect of the invention, the fluid delivery device 34 is a digital or computer controlled pump that delivers a predetermined amount of fluid F through the arm 12. Although any pump may generally be used, a Masterflex® Computerized Water Pump, available from Cole-Parmer of Vernon Hills, Ill., is a suitable fluid delivery device 34. The Cole-Parmer Masterflex® Computerized Water Pump can be operated via a Windows® Linkable Instrument Network (WINLIN) software program to link multiple pumps and mixers in synchronized or unsynchronized sequences of operation. The WINLIN program also features:

Flow calibration by volume, weight or flow reference

Multiple flow, volume and torque units

Volumetrical or gravimetrical dispensing

Constant or ramped flow/speed control

It is to be noted that the digital or computer controlled fluid delivery device 34 is provided by way of example only in FIG. 3. A syringe (not shown) or other "off-line" device can be suitably used to manually inject the fluid F in the material M. It is to be further noted that the fluid insult tube 30 is shown in FIG. 3 inserted in the arm 12 via the access hole 20b by way of example only and is not intended to limit the scope of the invention. Although the exemplary arrangement ensures that external forces do not disturb the fluid insult tube 30, the fluid insult tube 30 can be inserted at various points in or on the arm 12 to insult the material M. The fluid insult tube 30, for instance, can be arranged externally to the arm 12, such as by taping the fluid insult tube 30 to the surface 12c, or elevated a predetermined distance from the surface 12c without affecting operation of the fluid insult tube 30.

Figure 4:
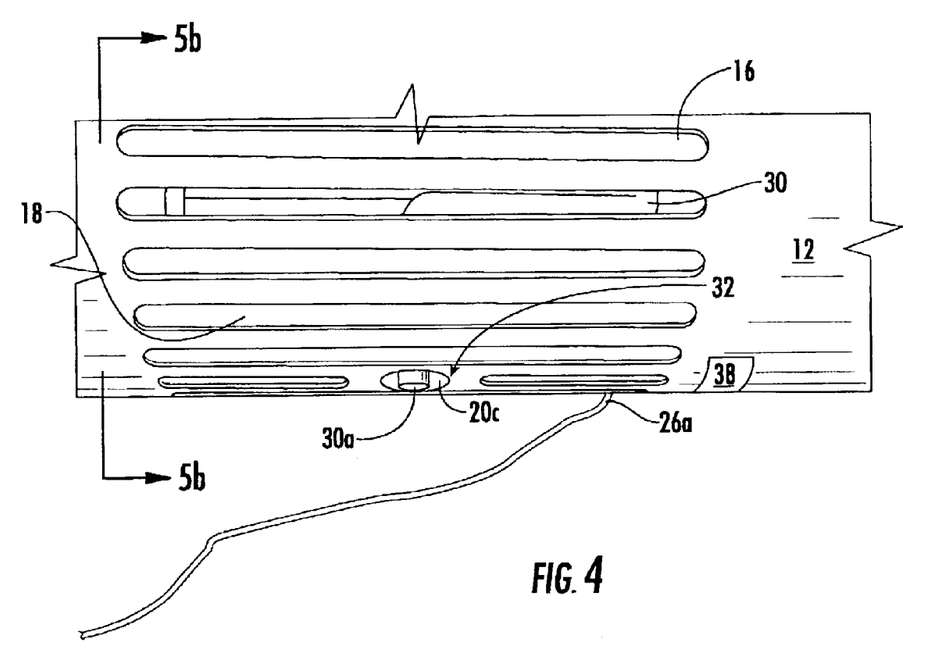
FIG. 4 is a partial perspective view of a portion of the virtual arm as in FIG. 2, particularly showing an exemplary chamber.

FIG. 4 shows a detailed perspective view of the slots 16 and the chamber 18 of the arm 12. The chamber 18 constitutes a void area of the arm 12, which in this example includes an open area/volume formed between a plurality of "fins" created between the slots 16. The exemplary slots 16 are machined into the arm 12 approximately in a center third portion of the arm 12, although the slots 16 can be machined in any other portion of the arm 12.

In this aspect of the invention, the slots 16 are elongated from about 2 inches to about 5 inches in length, more particularly about 4 inches long, and from about 0.0625 inches to about 3.0 inches wide, more particularly about 0.1875 inches wide. Moreover, the slots 16 are disposed about the surface 12c of the arm 12 substantially parallel to each other, and spaced apart from about 0.05 inches to about 0.5 inches, more particularly about 0.2 inches to create the chamber 18. In this exemplary embodiment, the chamber 18 is from about 0.25 inches to about 4 inches in diameter and from about 2 inches to about 5 inches in length.

The illustrated slots 16 are not limited to elongated, parallel geometries as described in the foregoing aspect of the invention. It is intended that the slots 16 have various sizes and shapes and be disposed on the arm surface 12c in regular or irregular relationship to each other, such as in uniform or non-uniform patterns, periodic or aperiodic patterns. Additionally, the slots 16 may not extend into a center of the arm 12 to form the chamber 18. The slots 16 may be depressions with multiple or uniform depths and have semi-hemispherical, rectangular, curvilinear or other geometric shapes. In one aspect, the slots 16 are about 0.0625 inches to about 3.0 inches wide and from about 2 inches to about 5 inches in length. Therefore, it is to be understood that additional or fewer slots 16, or various shapes and sizes of slots 16, will affect an overall size or existence of the chamber 18.

One purpose of slots 16 is to allow temperature and humidity to be measured within the microclimate created in the chamber 18. The microclimate is formed when the fluid F and/or a gas created from an evaporation of the fluid F enters the chamber 18. The dimensions of the slots 16 are designed to minimize the volume of the chamber 18 in order to minimize the time for the microclimate to stabilize. However, as will be described in an alternative embodiment below, the slots 16 and chamber 18 are provided by way of example only and not as a limitation of the invention. For instance, simply attaching the material M to the arm 12 and forming a space or void area between a surface of the material M and surface 12c of arm 12 is sufficient to create the microclimate.

FIG. 4 further shows the fluid insult tube 30 terminating at an opening 30a at an aperture 20c in the arm 12 to create a fluid insult point 32. In this aspect, the opening 30a of the tube 30 is from about 0.1875 of an inch to about 0.5 of an inch to simulate various fluid loading protocols. More particularly, in this aspect the opening 30a is about 0.3125 of an inch for insulting the material M with fluid F to simulate a urine load of a child. A particular protocol associated with this exemplary opening 30a is described in greater detail in the Experiment sections below. However, it is to be understood that the opening 30a can vary in size, number and placement on the arm 12 to simulate tear ducts, pores, a urethra, vaginal openings, body cavities or other orifices. Therefore, depending on the variations of opening 30a, various other fluid loading protocols can be applied to model adult perspiration, menses discharge, breast milk discharge, bleeding, or other fluid excretions.

FIG. 4 also shows the substrate 38 as a small patch or square of substrate relative to the opening 30a. Using VITRO-SKIN™ as the substrate 38, for example, the inventors have found that by placing the substrate 38 at various locations on the surface 12c of the arm 12 from the opening 30a better differentiates material M differences. For example, research has shown that 6 centimeters (cm) is an advantageous distance from the opening 30a to the substrate 38. Although distances of about 0 cm to about 12 cm are feasible, materials M may be difficult to differentiate using TEWL measurements and skin 38 when the substrate 38, for example, is too close to the opening 30a and is saturated by a surge of fluid F.

Figure 5A:
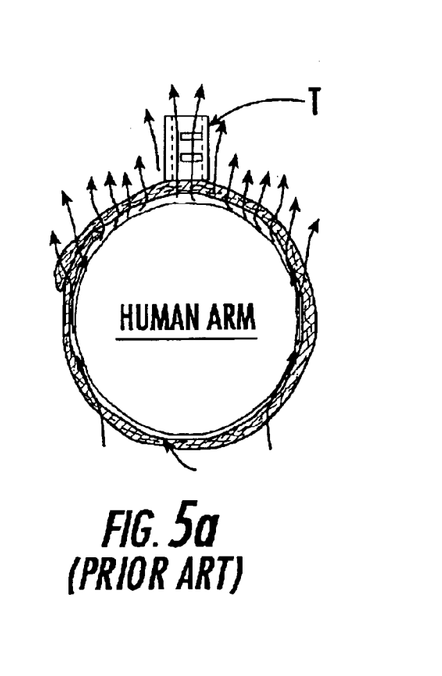
FIG. 5a is a cross-sectional end-view of a conventional evaluation apparatus.

FIG. 5a shows a standard human armband test with a diaper M wrapped about the arm and external measurements being taken by a TEWL probe T. In this example, the TEWL probe T measures real-time temperature and/or humidity and water loss across two probes within the TEWL probe T.

Figure 5B:
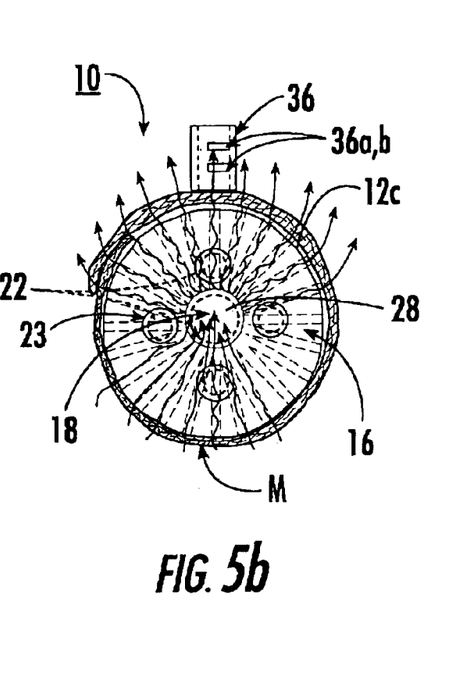
FIG. 5b is a cross-sectional end-view of the apparatus as in FIG. 4 taken along lines Vb—Vb.

With reference to FIGS. 2–4 and 5b, the virtual arm 12 is shown performing a test similar to that of FIG. 5a. More specifically, FIG. 5b shows a TEWL probe 36 with temperature and humidity sensors 36a,b arranged on the outer area of the diaper M. The heaters 22 are shown in FIG. 5b inserted in the heater holes 23 to heat the arm 12, its chamber 18 and/or the surface 12c to a normal human body temperature. As briefly introduced, the temperature, humidity, and/or Rh sensor 28 is inserted in the chamber 18 to correlate external human arm TEWL tests to relative humidity (Rh) in the chamber 18. The substrate 38 is attached to the surface 12c and the material M is wrapped about the surface 12c. Similar to the TEWL probe T in FIG. 5a, the sensors 36a,b sense evaporative water loss from the outer area of the material M. More detailed examples of this exemplary operation are described under the Experiment sections below.

Figure 5C:
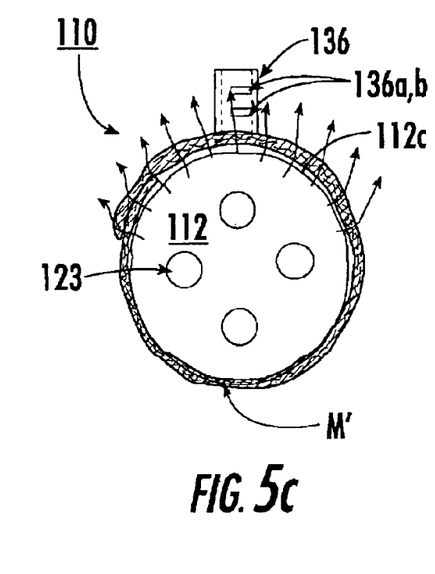
FIG. 5c is a cross-sectional end-view of another embodiment according to the invention.

FIG. 5c shows an alternative embodiment of the bench test device, generally indicated by the numeral 110. A virtual arm 112 is provided in this aspect similar to the arm 12 described above. However, the embodiment of FIG. 5c does not use elongated slots 16 to form a chamber 18. In this alternative aspect of the invention, heaters (not shown but similar to heaters 22) are inserted in heater holes 123 to heat the arm 112 similar to the foregoing embodiment. A material M' such as a diaper is wrapped about a surface 112c of the arm 112. TEWL, temperature and humidity measurements, and the like are taken, also as previously described.

Figure 6:
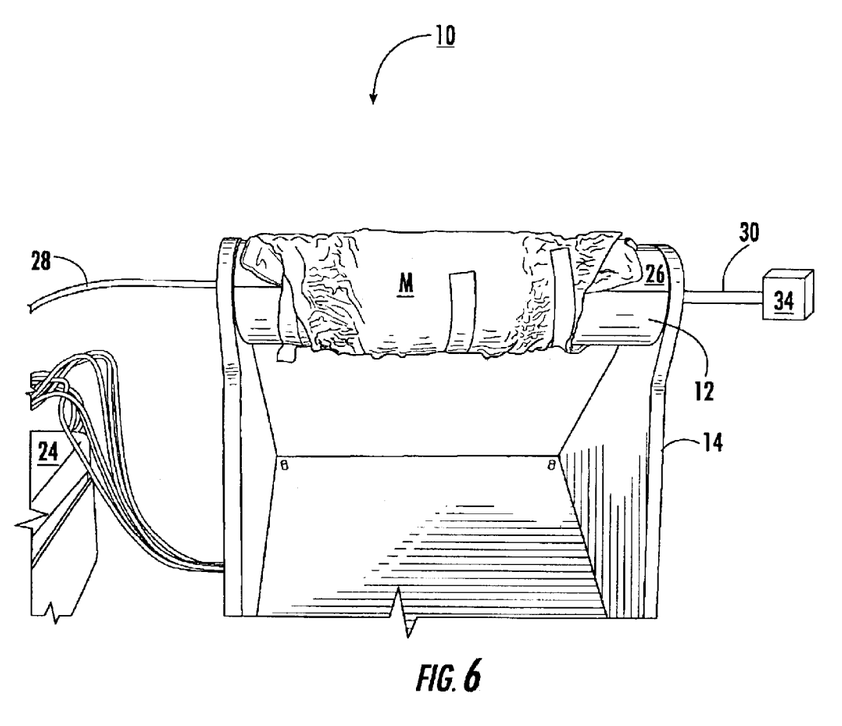
FIG. 6 is a perspective view of the apparatus in accordance with a further aspect of the invention, particularly showing a material being evaluated.

By way of example operation, FIG. 6 shows the material M wrapped about the arm 12 and attached by, for example, tape or hook and loop fastening systems. The fluid delivery device 34 injects the fluid F into the arm 12, while the controller 24, heats the heaters 22 to heat the arm 12 to the normal human body temperature, described in greater detail above. The skin 38 (see, e.g., FIG. 4) is disposed proximate the opening 30a at a predetermined distance also as previously described. The fluid delivery device 34 delivers the fluid F through the tube 30 via the opening 30a in accordance with a predetermined fluid loading protocol into the material M. After a predetermined time, TEWL or other evaluations of the microclimate, the substrate 38, and the material M are made. Any suitable monitor and/or recording device (not shown) can be provided to selectively record a condition resulting from these evaluations, including the temperature or the humidity, for comparison to subsequent experiments.

The present invention may be better understood with reference to the following Experiments and protocols.

I. Experiment Conducted on an Exemplary Embodiment of the Invention

Results derived from an experiment conducted in accordance with one exemplary embodiment of the present invention are as follows.

Experiment

In the following experiment, a diaper M was tested on the arm 12 as illustrated in FIGS. 1–4, 5b, and 6. In this experiment, a Step 3 Ultra-Trim® diaper was used as the diaper M. The diaper M was attached about the arm 12 proximate the slots 16 and opening 30a. A digital pump 34, capable of less than 1 cubic centimeters per minute (cc/min) to over 800 cc/min, was set to insult 60 cc/min of simulated physiological fluid F in 12 seconds. Prior to wrapping the diaper M on the arm 12, ambient conditions were recorded at 71.50° F., 39.5 Rh. The arm 12 was warmed with the heaters 22 to a temperature of 90° F. A human arm, as seen in FIG. 5a, was left unwrapped and differences in temperature and humidity and the like were observed and recorded. Both the virtual arm 12 and the human arm were wrapped with the material M but not loaded with fluid F. The material M was insulted with fluid F three times and evaluated after 30–90 minutes.

Results

Figure 7:
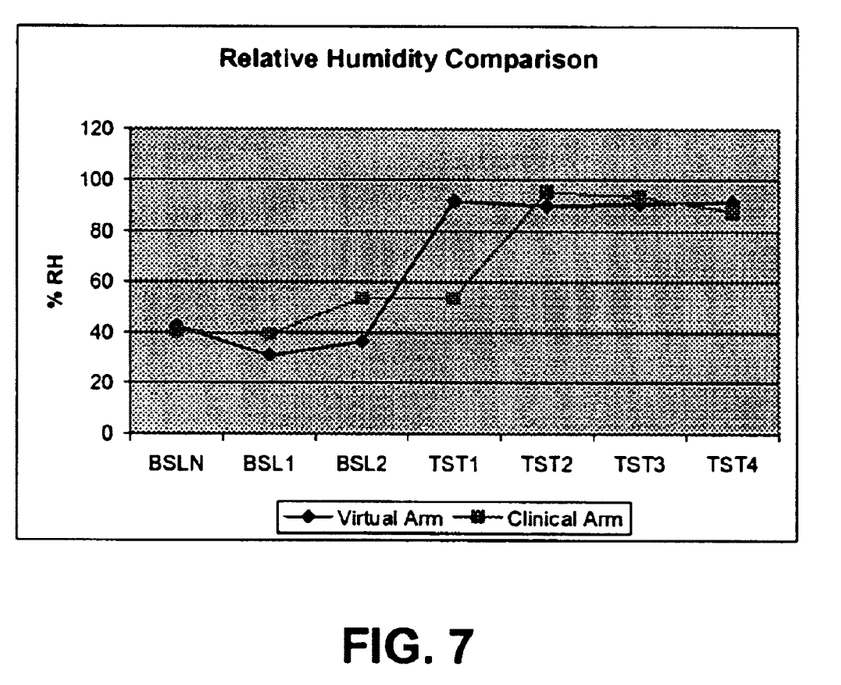
FIG. 7 is a graph showing a relative humidity comparison between a virtual arm and a clinical arm.
Figure 8:
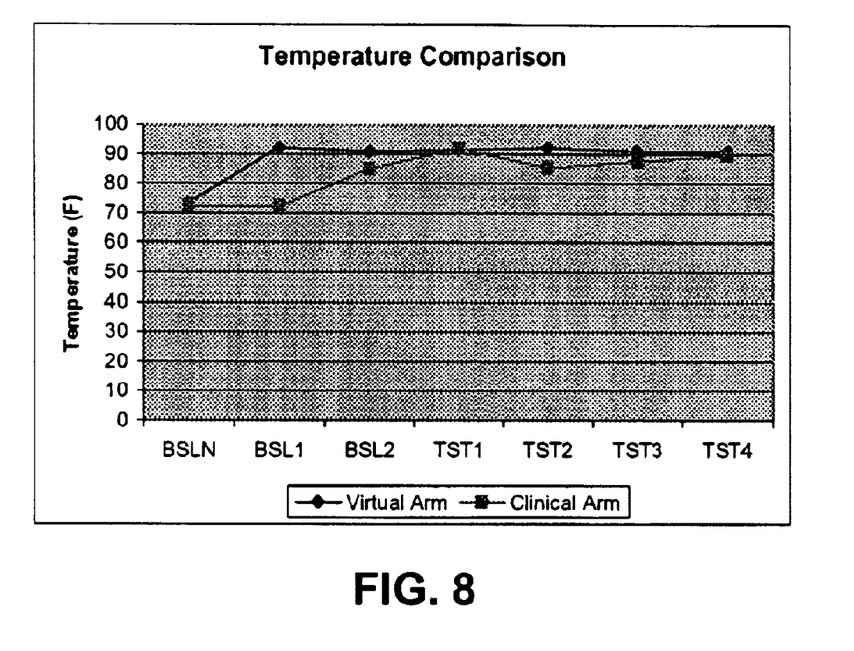
FIG. 8 is a graph showing a temperature comparison between a virtual arm and a clinical arm.
Figure 9:
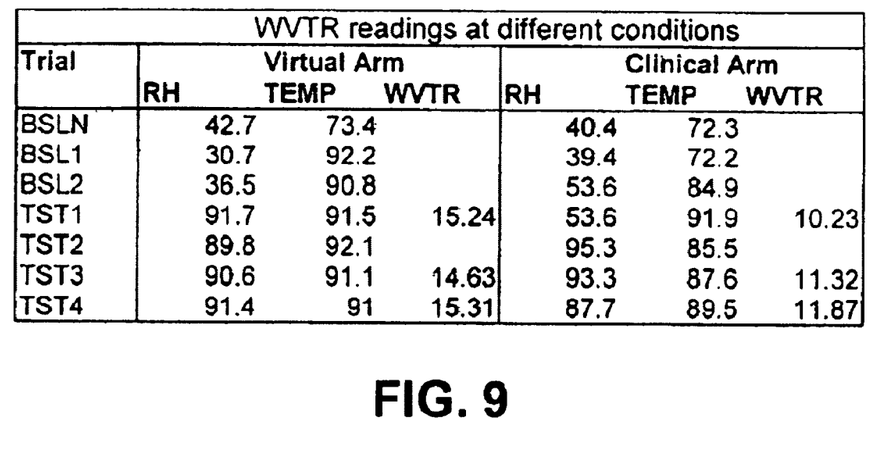
FIG. 9 is a chart showing various trial reading comparing a virtual arm and a clinical arm.

Tables 1–3, respectively at FIGS. 7–9, show comparisons between the virtual arm 12 and a human arm as in FIG. 5a. The first data check after the fluid F was injected in the materials M resulted in a lower Rh data reading, as seen in Table 1, at FIG. 7. This was attributed to the probe 28 not being placed in an insult area of the human arm. The probe 28 was then moved to the insult area of the human arm and a second data check was made after the second insult of fluid F. A third check was completed after a third injection of fluid F. A fourth check was completed after a fourth injection of fluid F. The preliminary test results as shown in Tables 1–3, indicate that the virtual arm 12 can maintain a temperature and humidity similar to a real human arm.

II. Experiment Conducted on another Exemplary Embodiment of the Invention

In accordance with another exemplary embodiment of the present invention, results derived from a clinical TEWL study conducted on 20 subjects testing for commercially available diaper products are as follows.

Experiment

The following test involved the recording of baseline readings on the skins of the human subjects for TEWL and on the outside of dry diapers for WVTR. After a saline F was added to the diaper M, Rh and temperature readings were taken inside the diaper M using an HM138 probe at 20, 40, and 60 minutes into the test. A final TEWL measurement was also taken.

In a second test, the arm 12 was used instead of human subjects. With a sample size of 10, a baseline WVTR reading was taken on the outside of a dry diaper M applied to the arm 12. Rh/temperature and WVTR readings were taken at 20, 40, and 60 minutes into the test after saline F was added to the diaper M.

Results

Data from the clinical study was compared to the data in the subsequent arm 12 study to see if TEWL correlated to Rh inside the virtual arm 12. A correlation was found between WVTR on the human subjects and WVTR on the virtual arm 12. Additionally, reduced variability was noted in the data (lower standard deviation) for numerous variables measured.

Based on the strong correlation between the foregoing comparisons between human tests and the virtual arm 12 experiments and the repeatability of the latter, the arm 12 is suitable for a variety of uses and is not limited to the foregoing examples. For instance, the arm 12 can be employed as a bench test for evaluating materials for dryness and other related properties; for establishing procedures for measuring dryness in materials; for evaluating equipment used to measure dryness; for screening competitive products; for performing other research and development and the like.

While preferred embodiments of the invention have been shown and described, those skilled in the art will recognize that other changes and modifications may be made to the foregoing embodiments without departing from the spirit and scope of the invention. For example, specific shapes of various elements of the illustrated embodiment may be altered to suit particular applications such as shaping the arm 12 as a lower torso mannequin, an upper torso mannequin, a full body mannequin, a mannequin forearm, a mannequin hand, a mannequin foot, a mannequin head and various other portions of a human body. It is intended to claim all such changes and modifications as fall within the scope of the appended claims and their equivalents.

That which is claimed is:

1. A device for simulating human skin microclimate and for measuring conditions in a simulated microclimate, the device comprising:

an object having a surface, a plurality of apertures therethrough and a chamber therein, a first one of the apertures configured to pass a fluid into communication between the surface and a material disposed about the surface and the first one of the apertures;

a heater attachable to the object configured to heat the object, the heated object and the fluid cooperable to produce a microclimate; and a sensor disposed in the chamber configured to sense the microclimate.

2. The device as in claim 1, wherein the object is selected from the group consisting of a lower-torso mannequin, an upper-torso mannequin, a full-body mannequin, a mannequin forearm, a mannequin hand, a mannequin foot, a mannequin leg, a mannequin head and combinations thereof.

3. The device as in claim 2, wherein the mannequin forearm is cylindrically shaped.

4. The device as in claim 3, wherein the cylindrically shaped mannequin forearm defines a circumference from between 2 inches to 80 inches.

5. The device as in claim 1, wherein the object is selected from the group consisting of a metal, a glass, a resin, an epoxy, a polymer, and combinations thereof.

6. The device as in claim 5, wherein the metal is selected from the group consisting of an aluminum, a steel, a tin, a brass, an iron, and combinations thereof.

7. The device as in claim 1, wherein the object defines a slot therethrough, the slot extending from the surface of the object to the chamber.

8. The device as in claim 7, wherein the chamber is a void area defined in the object configured for occupation by one of the fluid, a plurality of fluids, a gas from one of the fluid or plurality of fluids, and combinations thereof.

9. The device as in claim 8, wherein the chamber is from 0.25 inches to 4.0 inches in diameter and from 2 inches to 5 inches in length.

10. The device as in claim 7, wherein the slot is elongated, the elongated slot substantially parallel to the chamber.

11. The device as in claim 7, wherein the slot is from 0.0625 inches to 3.0 inches wide and from 2 inches to 5 inches in length.

12. The device as in claim 7, wherein the slot comprises a plurality of slots disposed about the surface of the object substantially parallel to each other, the plurality of slots spaced apart from each other from 0.05 inches to 0.5 inches.

13. The device as in claim 1, wherein the heater comprises a plurality of heater cartridges configured for insertion in the object via respective apertures of the plurality of apertures.

14. The device as in claim 13, wherein the plurality of heater cartridges is configured to produce heat from between 80° F. to 120° F. to heat the object to a normal human body temperature.

15. The device as in claim 1, wherein the heater heats the object.

16. The device as in claim 15, wherein the object, the surface, the chamber, or combinations thereof exhibit a uniform temperature.

17. The device as in claim 1, wherein the microclimate is produced in one of the chamber, the plurality of apertures, proximate a side of the material disposed apart from the surface, proximate another side of the material facing the surface, about a substrate attached to the surface, and combinations thereof.

18. The device as in claim 1, wherein the microclimate includes one of a temperature, a relative humidity, an absolute humidity, a fluid, a gas and combinations thereof.

19. The device as in claim 1, wherein the first one of the apertures is from 0.1875 inches to 0.5 of an inch in diameter with a tubing terminating proximate the first one of the apertures, the tubing having an outlet configured to deliver the fluid through the first one of the apertures to insult the material.

20. The device as in claim 19, further comprising a fluid delivery device in communication with the tubing proximate a second one of the apertures, the fluid delivery device and the tubing configured to cooperably insult a predetermined amount of the fluid through the first one of the apertures into the material.

21. The device as in claim 20, wherein the fluid delivery device is a computer controlled pump.

22. The device as in claim 19, wherein the tubing is made from one of the group consisting of glass, metal, plastic, rubber, and combinations thereof.

23. The device as in claim 19, wherein the first one of the apertures and the tubing outlet cooperably simulate an opening selected from the group consisting of a tear duct, a urethra, a pore, a body cavity, and combinations thereof.

24. The device as in claim 1, further comprising a substrate removably attached to the surface, the material disposed about the substrate, the fluid transmittable into communication proximate the substrate and the material, the substrate configured for evaluation.

25. The device as in claim 24, wherein the substrate is selected from the group consisting of a medical grade collagen film, a collagen disposed in a sausage casing, a chamois, a cellulose film, a cultured skin substrate, a bioengineered skin, a living skin sample, a dead skin sample and combinations thereof.

26. The device as in claim 1, wherein the material is selected from the group consisting of disposable or non-disposable diapers, disposable or non-disposable adult incontinence products, disposable or non-disposable feminine products, disposable or non-disposable nursing healthcare products, disposable or non-disposable child training pants, disposable or non-disposable face masks, disposable or non-disposable bandages, disposable or non-disposable gloves, micro-porous film, stretchable film, latex rubber, cotton gauze, bandage materials, carded webs, VFL, SBL, SMS, spunbond, cellulose, absorbent composites and combinations thereof.

27. The device as in claim 1, wherein the fluid is selected from the group consisting of water, saline, synthetic or natural menses, synthetic or natural urine, synthetic or natural BM, artificial or natural breast milk, synthetic or natural blood, 0.9% sodium chloride solution, colored solution, and combinations thereof.

28. The device as in claim 1, wherein the sensor is inserted into the chamber via one of the apertures.

29. The device as in claim 1, wherein the sensor is one of an RH probe, a temperature probe, a spectroscopic probe, a chromatographic probe, a fiber optic waveguide, a video camera, a CCTV camera, an IR camera and combinations thereof.

30. The device as in claim 1, further comprising a measuring device configured to measure an exterior condition of the material by one of capacitance, capacitive reactance, conductance, electrical impedance, WVTR and TEWL.

31. The device as in claim 30, wherein the measuring device is a TEWL probe configured to measure a water vapor transmission rate of the material.

32. The device as in claim 1, further comprising a temperature controller in controllable communication with the heater, the temperature controller configured to sense a temperature of the heated object and regulate the heater.

33. The device as in claim 32, wherein the temperature controller includes a temperature sensor attachable to the object, the temperature sensor configured to sense and communicate the temperature of the heated object to the temperature controller.

34. The device as in claim 1, further comprising a base configured for removable attachment to the object.

35. The device as in claim 34, wherein the object is adjustable relative to the base.

36. A device for simulating a human skin microclimate and for measuring conditions in a simulated microclimate, the device comprising:
   an object having a surface with a material disposed thereon;
   a heater attachable to the object and configured to heat the object, the heated object and one of a fluid and a gas cooperable to produce a microclimate proximate a void formed in the object and the material; and
   a sensor disposed about the object, the sensor configured to sense the microclimate proximate the void.

37. The device as in claim 36, wherein the object is selected from the group consisting of a lower-torso mannequin, an upper-torso mannequin, a full-body mannequin, a mannequin forearm, a mannequin hand, a mannequin foot, a mannequin leg, a mannequin head and combinations thereof.

38. The device as in claim 37, wherein the mannequin forearm is cylindrically shaped.

39. The device as in claim 38, wherein the cylindrically shaped mannequin forearm defines a circumference from between 2 inches to 80 inches.

40. The device as in claim 36, wherein the object is selected from the group consisting of a metal, a glass, a resin, an epoxy, a polymer, and combinations thereof.

41. The device as in claim 40, wherein the metal is selected from the group consisting of an aluminum, a steel, a tin, a brass, an iron, and combinations thereof.

42. The device as in claim 36, wherein the object defines the microclimate between the object and the material.

43. The device as in claim 42, wherein the microclimate is disposed in the void defined about the object and configured for occupation by the fluid.

44. The device as in claim 43, wherein the void is defined by a depression on the surface of the object.

45. The device as in claim 44, wherein the depression is 0.0625 inches to 3.0 inches wide and from 2 inches to 5 inches in length.

46. The device as in claim 44, wherein the depression comprises a plurality of depressions disposed about the surface of the object substantially parallel to each other, the plurality of depressions spaced apart from each other from 0.05 inches to 0.5 inches.

47. The device as in claim 36, further comprising a first aperture therethrough the surface, the first aperture configured to pass the fluid into communication between the surface and a material disposed about the surface and the first aperture.

48. The device as in claim 36, wherein the heater comprises a plurality of heater cartridges configured for insertion in the object via respective apertures of the plurality of apertures.

49. The device as in claim 48, wherein the plurality of heater cartridges is configured to produce heat from between 80° F. to 120° F. to heat the object to a normal human body temperature.

50. The device as in claim 36, wherein the heater heats the object.

51. The device as in claim 50, wherein the object, the surface, the chamber, or combinations thereof exhibit a uniform temperature.

52. The device as in claim 36, wherein the microclimate includes one of a temperature, a relative humidity, an absolute humidity, and combinations thereof.

53. The device as in claim 47, wherein the first aperture is from 0.1875 inches to 0.5 of an inch in diameter with a tubing terminating proximate the first aperture, the tubing having an outlet configured to deliver the fluid through the first aperture to insult the material.

54. The device as in claim 53, wherein the tubing is inserted into the object via a second aperture.

55. The device as in claim 54, further comprising a fluid delivery device in communication with the tubing proximate the second aperture, the fluid delivery device and the tubing configured to cooperably insult a predetermined amount of the fluid through the first aperture into the material.

56. The device as in claim 55, wherein the fluid delivery device is a computer controlled pump.

57. The device as in claim 53, wherein the tubing is made from one of the group consisting of glass, metal, plastic, rubber, and combinations thereof.

58. The device as in claim 53, wherein the first aperture and the tubing outlet cooperably simulate an opening selected from the group consisting of a tear duct, a urethra, a pore, a body cavity, and combinations thereof.

59. The device as in claim 36, further comprising a substrate removably attached to the surface, the material disposed about the substrate, the fluid transmittable into communication proximate the substrate and the material, the substrate configured for evaluation.

60. The device as in claim 59, wherein the substrate is selected from the group consisting of a medical grade collagen film, a collagen disposed in a sausage casing, a chamois, a cellulose film, a cultured skin substrate, a bioengineered skin, a living skin sample, a dead skin sample and combinations thereof.

61. The device as in claim 36, wherein the material is selected from the group consisting of disposable or non-disposable diapers, disposable or non-disposable adult incontinence products, disposable or non-disposable feminine products, disposable or non-disposable nursing healthcare products, disposable or non-disposable child training pants, disposable or non-disposable face masks, disposable or non-disposable bandages, disposable or non-disposable gloves, micro-porous film, stretchable film, latex rubber, cotton gauze, bandage materials, carded webs, VFL, SBL, SMS, spunbond, cellulose, absorbent composites and combinations thereof.

62. The device as in claim 36, wherein the fluid is selected from the group consisting of water, saline, synthetic menses, synthetic urine, synthetic BM, artificial breast milk, blood, 0.9% sodium chloride solution, colored solution, and combinations thereof.

63. The device as in claim 36, wherein the sensor is inserted proximate the microclimate.

64. The device as in claim 36, wherein the sensor is one of an RH probe, a temperature probe, a spectroscopy probe, a chromatographic probe, a fiber optic waveguide, a video camera, a CCTV camera, an IR camera and combinations thereof.

65. The device as in claim 36, further comprising a measuring device configured to measure an exterior condition of the material by one of capacitance, conductance, electrical impedance, WVTR and TEWL.

66. The device as in claim 65, wherein the measuring device is a TEWL probe configured to measure a water vapor transmission rate of the material.

67. The device as in claim 36, further comprising a temperature controller in controllable communication the heater, the temperature controller configured to sense a temperature of the heated object and regulate the heater.

68. The device as in claim 67, wherein the temperature controller includes a temperature sensor attachable to the object, the temperature sensor configured to sense and communicate the temperature of the heated object to the temperature controller.

69. The device as in claim 36, further comprising a base configured for removable attachment to the object.

70. The device as in claim 69, wherein the object is adjustable relative to the base.

71. A method of simulating a human skin microclimate and for measuring conditions in a simulated microclimate, the method comprising the steps of:
   providing an object with an aperture therethrough and a sensor configured to sense a condition of a microclimate;
   at least partially covering the object with a material;
   heating the object to a normal human body temperature;
   insulting the material with a fluid from a fluid delivery device; and
   assessing the condition of the microclimate with the sensor, the microclimate interposed between the surface and the material.

72. The method as in claim 71, wherein the object is selected from the group consisting of a lower-torso mannequin, an upper-torso mannequin, a full-body mannequin, a mannequin forearm, a mannequin hand, a mannequin foot, a mannequin head, and combinations thereof.

73. The method as in claim 71, further comprising the step of warming the fluid before insulting the material.

74. The method as in claim 71, wherein the heating step is performed by a plurality of heater cartridges configured for insertion in the object via a plurality of apertures.

75. The method as in claim 74, wherein the plurality of heater cartridges are configured to produce heat from between 80° F. to 120° F. to heat the surface.

76. The method as in claim 71, wherein the material is an absorbent article selected from the group consisting of disposable or non-disposable diapers, disposable or non-disposable adult incontinence products, disposable or non-disposable feminine products, nursing healthcare products, disposable or non-disposable child training pants, face masks, bandages, gloves and combinations thereof.

77. The method as in claim 71, wherein the fluid is selected from the group consisting of water, saline, synthetic menses, synthetic urine, synthetic BM, artificial breast milk, blood, sodium chloride solution, colored solution, and combinations thereof.

78. The method as in claim 71, further comprising the step of controlling a temperature of the heated surface via a temperature controller in electrical communication with the surface.

79. The method as in claim 71, further comprising the step of evaluating the material by one of capacitance, conductance, capacitive reactance, electrical impedance, WVTR and TEWL.

80. The method as in claim 79, further comprising a measuring device with a TEWL probe, the TEWL probe disposable on an exterior of the material spaced apart from the surface of the object.

81. The method as in claim 71, further comprising the step of monitoring the microclimate with a monitor, the monitor configured to selectively record the condition including a temperature and a humidity.

* * * * *

UNITED STATES PATENT AND TRADEMARK OFFICE
CERTIFICATE OF CORRECTION

PATENT NO. : 7,037,112 B2  
APPLICATION NO. : 10/324365  
DATED : May 2, 2006  
INVENTOR(S) : Lord et al.

It is certified that error appears in the above-identified patent and that said Letters Patent is hereby corrected as shown below:

Title Page, item [75]

In the list of Inventors, please delete --Arvinder Singh-- and insert "Arvinder Pal Singh Kainth"

In the list of Inventors, please delete --Rick Beal-- and insert "Richard B. Beal"

In the References Cited, U.S.Patent Documents, line 1, page 2, col. 2, 4,041,203 A, delete --Brock et al.--and insert "Brock"

In the References Cited, U.S. Patent Documents, after 6,483,324 listing, please insert "6,503,525 B1 1/2003 Paul et al." as per the IDS submitted on March 15, 2004.

Column 10, line 66, please delete --80° F. to 120° F.-- and insert "80° F to 120° F"

Column 13, line 12, please delete --80° F. to 120° F.-- and insert "80° F to 120° F"

Column 14, line 58, please delete --80° F. to 120° F.-- and insert "80° F to 120° F"

Signed and Sealed this

Twenty-second Day of August, 2006

JON W. DUDAS  
*Director of the United States Patent and Trademark Office*